(12) United States Patent
Anton et al.

(10) Patent No.: US 7,736,700 B2
(45) Date of Patent: Jun. 15, 2010

(54) METHOD FOR PRODUCTION OF A COATING SYSTEM

(75) Inventors: Reiner Anton, Duisburg (DE); Christian Báhr, Hamm (DE); Brigitte Heinecke, Mülheim an der Ruhr (DE); Michael Ott, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 1105 days.

(21) Appl. No.: 10/574,722

(22) PCT Filed: Sep. 15, 2004

(86) PCT No.: PCT/EP2004/010349

§ 371 (c)(1),
(2), (4) Date: Apr. 6, 2006

(87) PCT Pub. No.: WO2005/037483

PCT Pub. Date: Apr. 28, 2005

(65) Prior Publication Data

US 2007/0059486 A1    Mar. 15, 2007

(30) Foreign Application Priority Data

Oct. 6, 2003   (EP)  .................................. 03022634

(51) Int. Cl.
*B05D 3/02* (2006.01)

(52) U.S. Cl. ................. 427/383.1; 427/333; 427/383.7; 427/419.1

(58) Field of Classification Search ................. 427/140, 427/226, 229, 230, 258, 333, 337, 372.2, 427/383.1, 383.7, 402, 419.1, 419.2, 419.3
See application file for complete search history.

(56) References Cited

U.S. PATENT DOCUMENTS

| 2,735,155 | A | * | 2/1956 | Glaser | ........................ 501/96.3 |
| 3,573,963 | A | | 4/1971 | Maxwell | |
| 4,493,451 | A | * | 1/1985 | Clark et al. | .................. 228/119 |
| 5,549,767 | A | | 8/1996 | Pietruska et al. | |
| 2004/0050913 | A1 | * | 3/2004 | Philip | ........................ 228/194 |

FOREIGN PATENT DOCUMENTS

| DE | 38 16 310 A1 | 1/1989 |
| EP | 1 258 312 A2 | 11/2002 |
| JP | 2001 288554 A | 10/2001 |

* cited by examiner

*Primary Examiner*—William Phillip Fletcher, III

(57) ABSTRACT

Conventionally, cavities and cracks are filled with a solder metal which forms brittle phases with a subsequently applied coating, which have a negative effect on the mechanical properties. According to the invention, the components which form brittle phases are removed from the solder metal. The above is achieved, whereby a second material is applied which reacts with said component and which is removed again with the brittle phases, before the coating.

15 Claims, 5 Drawing Sheets

METHOD FOR PRODUCTION OF A COATING SYSTEM

CROSS REFERENCE TO RELATED APPLICATIONS

This application is the US National Stage of International Application No. PCT/EP2004/010349, filed Sep. 15, 2004, and published as WO 2005/037483 A1, and claims benefit thereof. The International Application claims the benefits of European Application No. EP 03022634.4, filed Oct. 6, 2003, both of these applications are incorporated by reference herein in their entirety.

FIELD OF THE INVENTION

The invention relates to a process for producing a layer system in accordance with the claims, and to a component as claimed in the claims.

BACKGROUND OF THE INVENTION

Turbine blades and vanes as well as other components for high-temperature applications, after prolonged use, in many cases have cracks or regions in which corrosion has occurred, in which case these cracks or regions have to be removed during refurbishment of the components, with the result that a recess is in each case formed there.

The cracks or the recess are then filled with a solder. The multicomponent solder contains, inter alia, agents for reducing the melting point (e.g. boron) or other constituents which, as tests carried out in the context of the present invention have demonstrated, form brittle phases (e.g. chromium boride) with a final coating (e.g. corrosion-resistant layer, heat-resistant layer) which is to be applied.

Therefore, layer systems of this type have poor mechanical properties, in particular at high temperatures. The function of the coating of protecting against oxidation and corrosion is also reduced.

SUMMARY OF THE INVENTION

Therefore, it is an object of the invention to provide a process and a component which improves these properties of the layer system with an underlying filled recess.

The invention is based on the discovery that a component of the solder reacts in an undesirable way with a coating that is subsequently applied.

The object is achieved by the process as claimed in the claims, in that in an intermediate step a second material is applied, which for example reacts with the first material, for example a solder, and extracts the undesirable constituents of the first material by virtue of at least in part forming compounds therewith.

The second material is then removed again together with the undesirable constituents that have been taken out of the first material, i.e. is sacrificed. Therefore, the boundary surface of the first material adjoining the coating no longer contains any constituents which can react in an undesirable way with the material of a coating that is yet to be applied.

However, the second material may also simply cover the first material and create a distance between it and the layer that is yet to be applied, preventing or significantly reducing a reaction of constituents of the first material with the coating. The coating of the second material therefore constitutes a diffusion barrier or threshold.

The object is also achieved by the component as claimed in the claims.

Further advantageous measures are listed in the subclaims.

The measures listed in the subclaims can be combined with one another in advantageous ways.

DETAILED DESCRIPTION OF THE INVENTION

Figure 1:
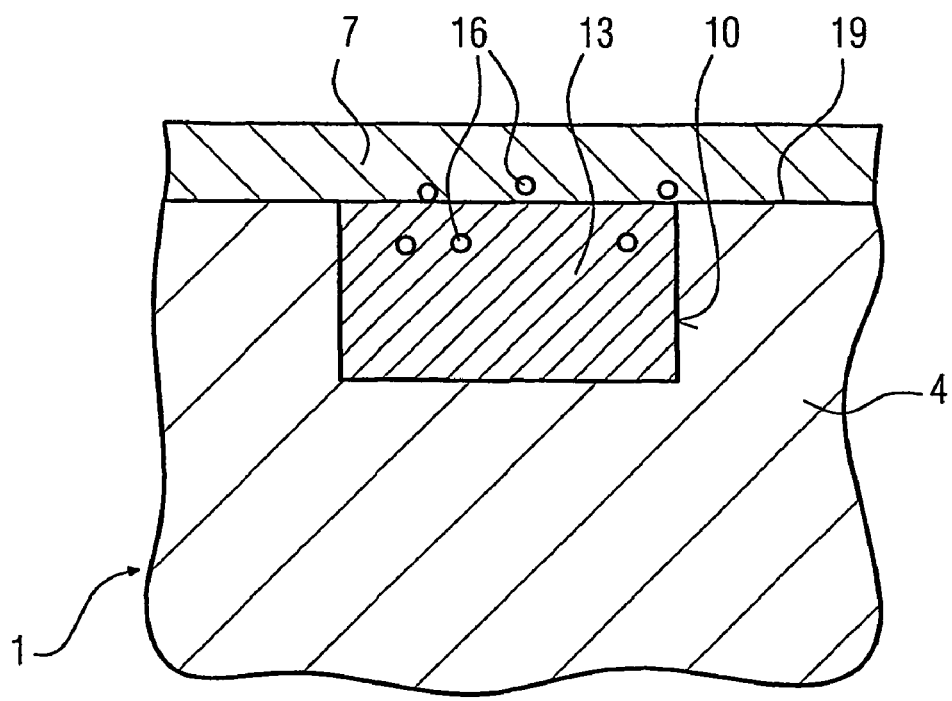
FIG. 1 shows a layer system according to the prior art.

FIG. 1 shows a layer system 1 which at least comprises a substrate 4 and at least one layer 7.

The layer system 1 is, for example, a component of a steam turbine or gas turbine 100 (blade or vane 120, 130, combustion chamber lining 155, etc.).

Therefore, the substrate 4 is, for example, a nickel-base or cobalt-base superalloy, i.e. is metallic. The substrate 4 may also be ceramic.

The coating 7 is ceramic or metallic and consists, for example, of an MCrAlX alloy. M stands for at least one element selected from the group consisting of Fe (iron), Co (cobalt) or Ni (nickel). X stands for yttrium and/or at least one rare earth element.

The substrate 4 has a recess 10 (crack, recess, milled-out portion), for example caused by the long operating use of a component or by the way in which it is produced. Correct coating of the substrate 4 is not yet possible in this state.

The recess 10 is pre-cleaned if necessary (removal of oxides) and then filled with a first multicomponent material 13. This is, for example, a solder 13. Solders 13 contain components which react with the coating 7 at elevated temperatures, for example as agents for reducing the melting point. Agents for reducing the melting point are often required to provide the solder with a low viscosity and to enable it to penetrate into and completely fill a narrow crack. By way of example, the solder 13 contains boron (B) or boron-containing compounds, which with the chromium (Cr) of the MCrAlX layer 7 form chromium boride phases 16, which are brittle and adversely affect the mechanical properties and/or corrosion-prevention properties.

These undesirable phases 16 are formed when at least one component (agent for reducing the melting point) of the first multicomponent material 13 reacts with the coating 7 during a subsequent heat treatment or during use in operation. In the process, boron diffuses into the coating 7 and/or chromium diffuses out of the coating 7 into the recess 10 containing the material 13.

Figure 2:
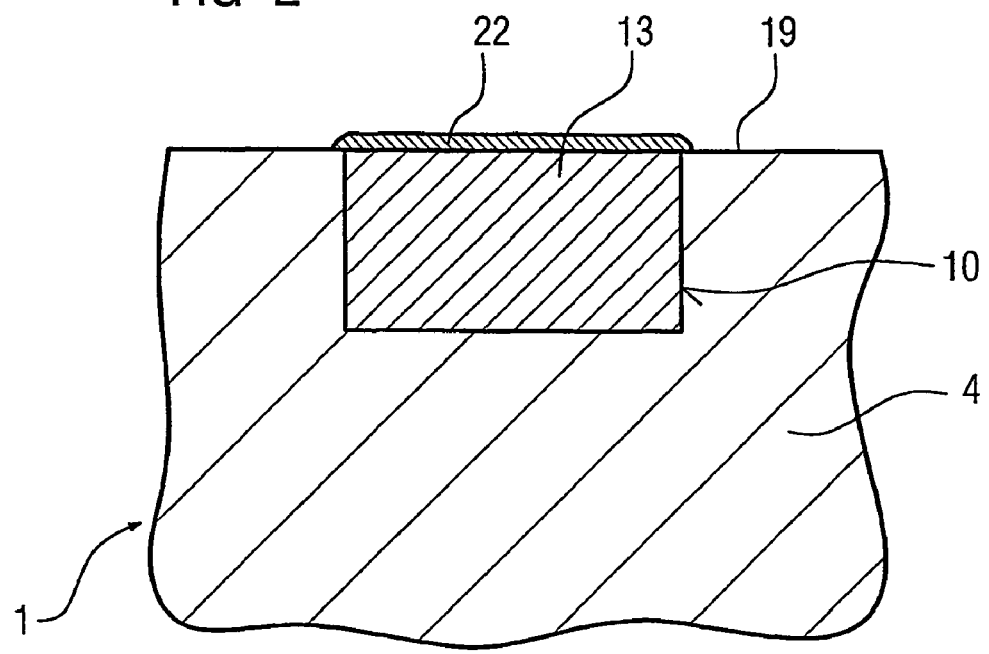
FIGS. 2 to 6 show process steps of the process according to the invention.

FIG. 2 shows a first step of the process according to the invention.

The recess 10 has already been filled with the solder 13 and if appropriate joined to the substrate 4 by a soldering heat treatment. In this case, the agent for reducing the melting point in the material 13 is still desirable in order to effect bonding of the material 13 to the substrate 4 in the recess 10.

In the region of the recess 10, a second material 22 is applied to a surface 19 of the substrate 4, forming a local coating (in this context, the term local means that the surface area of 22 (=cross-sectional area of recess 10) is smaller than (<20%) the surface area of the coating 7). The thickness of this layer of the material 22 is, for example, thinner than the coating 7 that is yet to be applied. The second material 22 is, for example, chromium, a chromium-containing compound or alloy or an alloy of other metals. Other materials are conceivable. The second material 22 can be applied using pastes, slurries, tapes, plasma spraying, etc. which have at least a high content of the second material 22.

Figure 3:
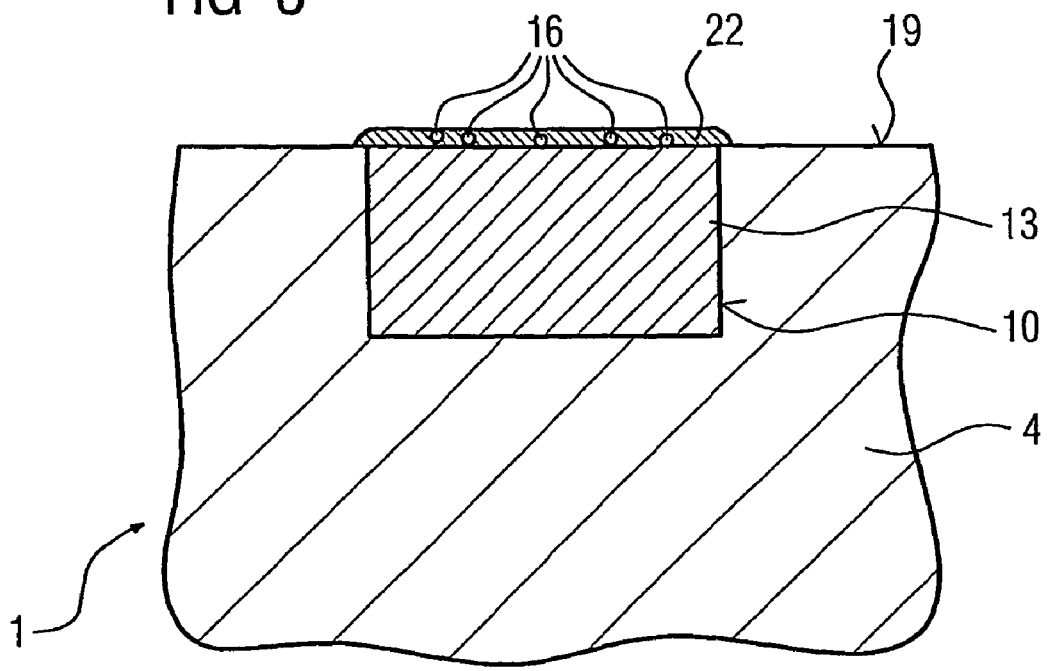

By means of a removal heat treatment, in particular a separate diffusion heat treatment at high temperatures, but alternatively for example even simultaneously with the above soldering heat treatment, during which the substrate 4 is heated together with the first material 13 and the second material 22, phases (compounds) 16 (FIG. 3) are formed, for example in the form of precipitations, with the result that at least one undesirable component, which forms undesirable phases 16 with the coating 7 that is yet to be applied (FIG. 5), is withdrawn from the first material 13.

These phases are, for example, chromium borides which form with the boron which is still unbonded following the soldering heat treatment. Interstitially dissolved boron (a lattice) in the material 22 is also conceivable.

The phases 16 can form in the material 22 and/or in the material 13 in the recess 10. Therefore, the material 22 is, for example, a constituent of the coating 7, for example chromium of the MCrAlX coating. However, it is also possible to select a material which does not contain any elements or constituents of the coating 7. It merely has to be able to react with the at least one undesirable component of the first material 13 which would otherwise react in an undesirable way with the coating 7.

Figure 6:
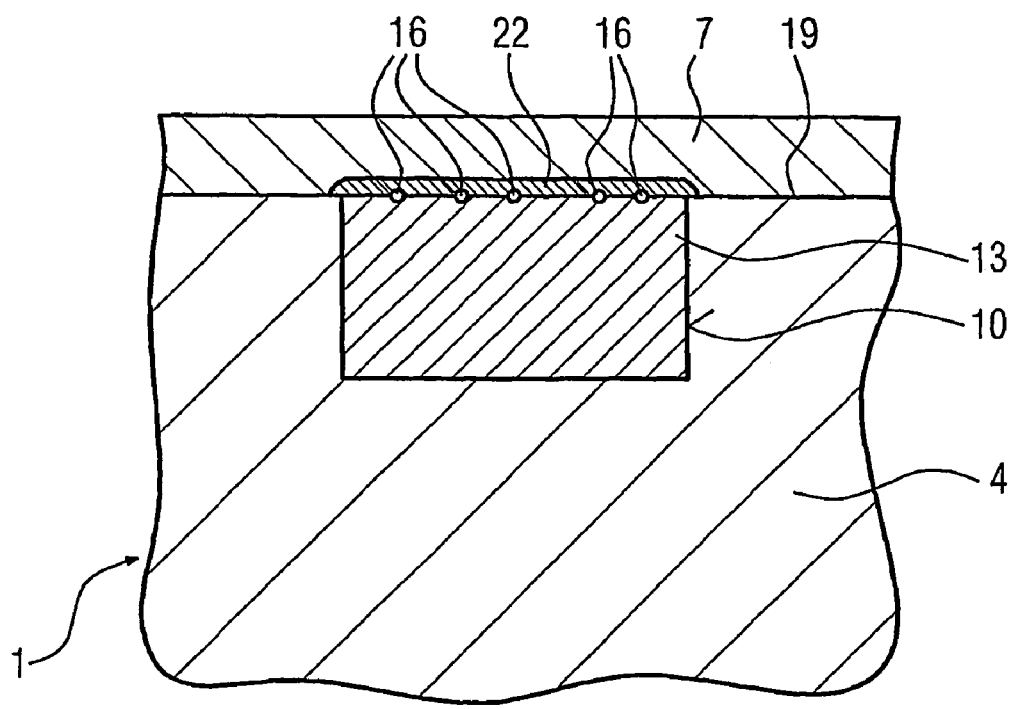

A coating can be carried out in this state (FIG. 6), because the second material 22 securely bonds the undesirable components of the first material 13 in the form of compounds, with the result that little if any reaction with the material of the coating 7 can then take place. The coating comprising the material 22 also constitutes a diffusion barrier or threshold to undesirable components which are still diffusing.

Figure 4:
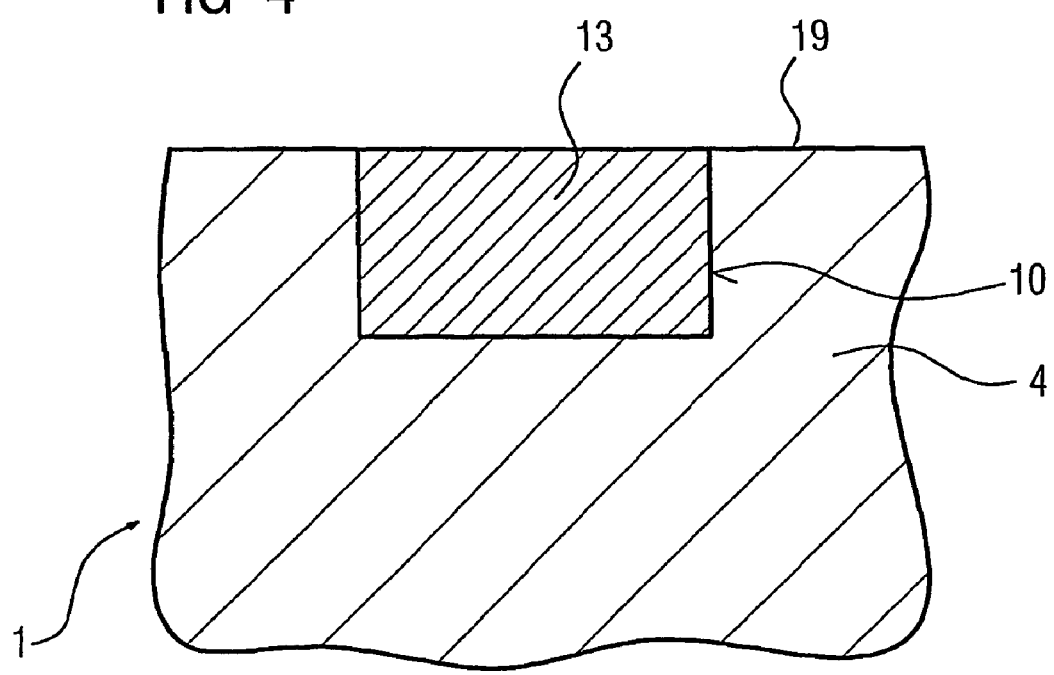
Figure 5:
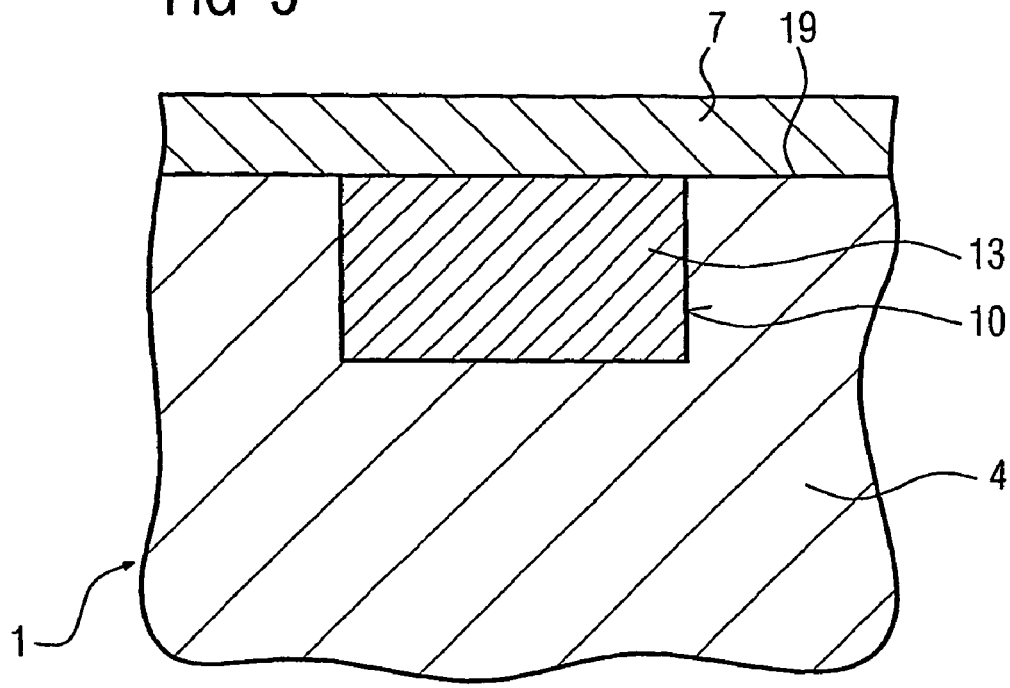

The second material 22 and/or material 13 comprising the brittle phases 16 may, however, also be removed (FIG. 4), in particular by grinding. This is followed by the application of the coating 7 (FIG. 5). Even subsequent heat treatments of the substrate 4 do not lead to the formation of any brittle phases in the coating 7, since the first material 13, at least in the vicinity of the surface 19, now contains little if any undesirable components which react with the material of the coating 7 to form undesirable compounds.

The component which is produced in this way may be a newly produced component or a used component. The process is employed in particular in the repair soldering of components (refurbishment).

This involves coating removal beforehand. The defects (cracks) are repaired using the process and if appropriate coated again, in particular with an MCrAlX followed by a ceramic thermal barrier coating.

Figure 7:
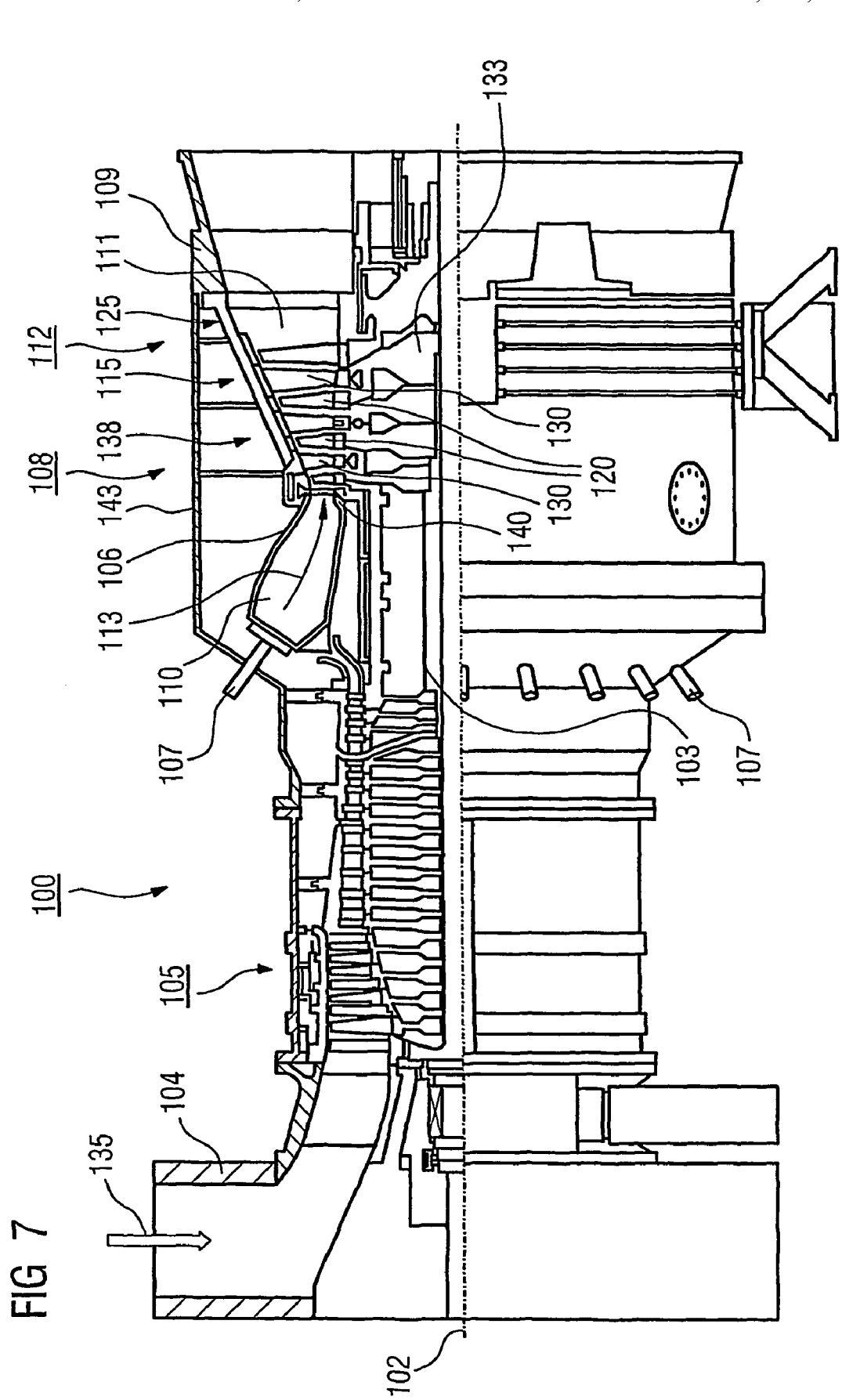
FIG. 7 shows a gas turbine.

FIG. 7 shows a partial longitudinal section through a gas turbine 100.

In the interior, the gas turbine 100 has a rotor 103 which is mounted such that it can rotate about an axis of rotation 102 and is also referred to as the turbine rotor. An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103. The annular combustion chamber 106 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to the stator 143, whereas the rotor blades 120 of a row 125 are fitted to the rotor 103 by means of a turbine disk 133. A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses. To be able to withstand the temperatures which prevail there, they are cooled by means of a coolant. It is also possible for the blades or vanes 120, 130 to have coatings which protect against corrosion (MCrAlX; M=Fe, Co, Ni, X=Y, rare earths) and heat (thermal barrier coating, for example $ZrO_2$, $Y_2O_4$—$ZrO_2$).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 8:
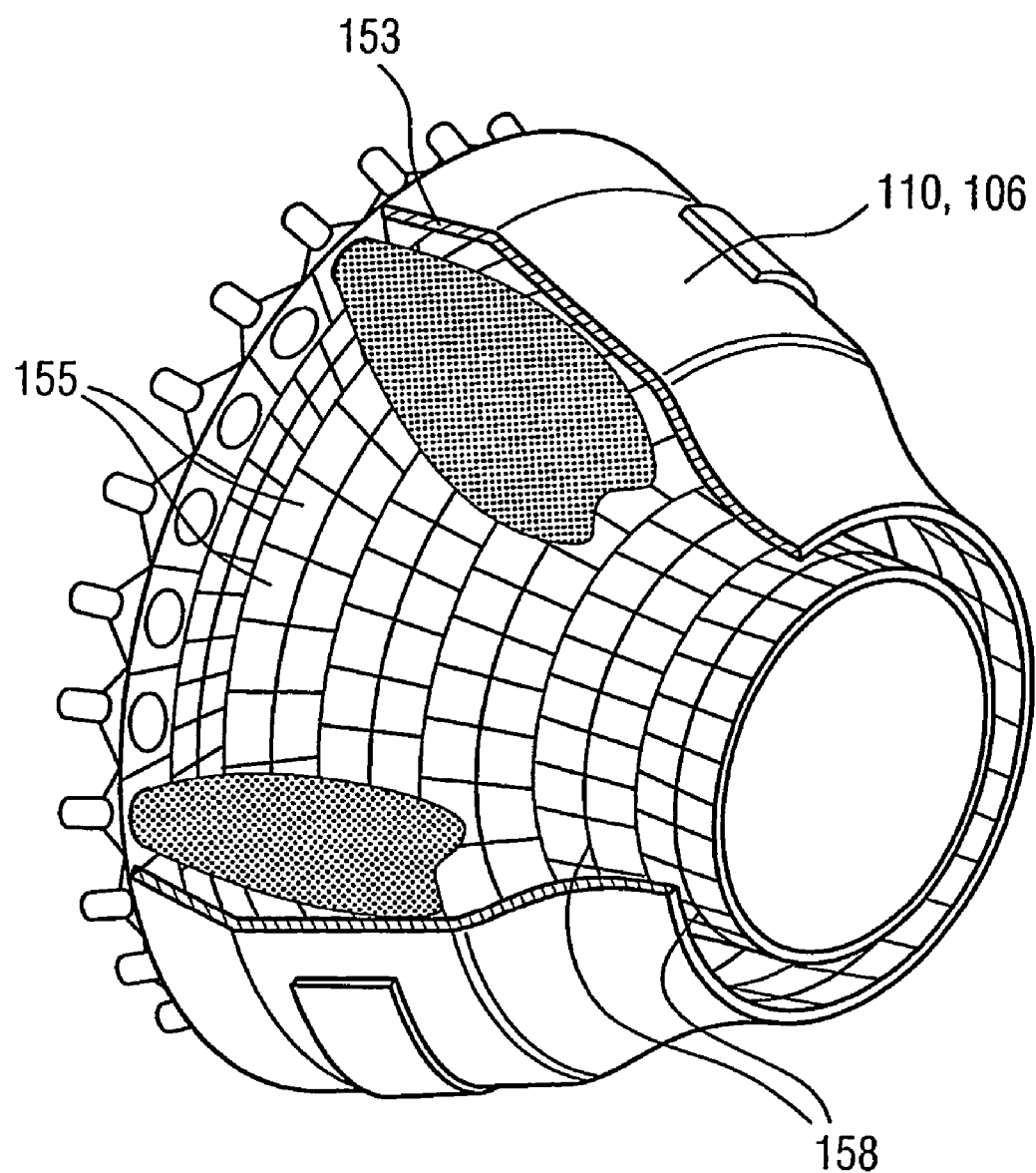
FIG. 8 shows a combustion chamber.

FIG. 8 shows a combustion chamber 110 of a gas turbine. The combustion chamber 110 is configured, for example, as what is known as an annular combustion chamber, in which a multiplicity of burners 102 arranged circumferentially around the turbine shaft 103 open out into a common combustion chamber space. For this purpose, the combustion chamber 110 overall is of annular configuration positioned around the turbine shaft 103.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155. On the working medium side, each heat shield element 155 is equipped with a particularly heat-resistant protective layer or is made from material that is able to withstand high temperatures. Moreover, on account of the high temperatures in the interior of the combustion chamber 110, a cooling system is provided for the heat shield elements 155 and/or for their holding elements.

The combustion chamber 110 is designed in particular to detect losses of the heat shield elements 155. For this purpose, a number of temperature sensors 158 are positioned between the combustion chamber wall 153 and the heat shield elements 155.

The invention claimed is:

1. A method for producing a layer system on a component, comprising:
   providing a substrate including a recess;
   filling the recess with a first material and an agent for reducing the melting point of the first material;
   forming a local coating by applying a second, metallic material in the region of the filled recess;
   performing a removal heat treatment during which the second, metallic material reacts with the agent for reducing the melting point of the first material, thereby extracting said agent;
   covering the region of the filled recess with a base coating comprising MCrAlX alloy;
   wherein extracting the agent inhibits diffusion of the agent into the base coating;
   wherein M is an element selected from the group consisting of: iron, cobalt, and nickel; and
   wherein X is yttrium or a rare earth element.

2. The method as claimed in claim 1, wherein the second, metallic material covers the agent for reducing the melting point of the first material in the recess and functions as a diffusion barrier.

3. The method as claimed in claim 1, wherein, after the removal heat treatment and prior to applying the base coating, the second, metallic material and the extracted agent are removed together by grinding.

4. The method as claimed in claim 1, wherein the first material is a solder.

5. The method as claimed in claim 4, further comprising a soldering heat treatment to bond the solder to the substrate in the recess prior to forming the local coating.

6. The method as claimed in claim 5, wherein the removal heat treatment is performed either simultaneously with the soldering heat treatment or as a separate diffusion heat treatment.

7. The method as claimed in claim 1, wherein the agent for reducing the melting point of the first material is boron or a boron-containing compound.

8. The method as claimed in claim 1, wherein the substrate is an iron-based superalloy, a nickel-based superalloy, a cobalt-based superalloy, or a ceramic.

9. The method as claimed in claim 1, wherein a thickness of the local coating is thinner than the base coating.

10. The method as claimed in claim 1, wherein the second, metallic material is chromium.

11. The method as claimed in claim 1, wherein the second, metallic material is applied in the form of a paste, a slurry, or a tape.

12. The method as claimed in claim 1, wherein the substrate is a turbine component of a gas turbine or a steam turbine.

13. The method as claimed in claim 1, wherein the first material is a multi-component material.

14. The method as claimed in claim 1, wherein the second, metallic material is a chromium-containing compound.

15. The method as claimed in claim 1, wherein the second, metallic material is a chromium-containing alloy.

* * * * *